A. J. BERGERON.
MACHINE FOR SUBMARINE SALVAGE OPERATIONS.
APPLICATION FILED MAY 11, 1915.
1,304,012.
Patented May 20, 1919.
5 SHEETS—SHEET 1.
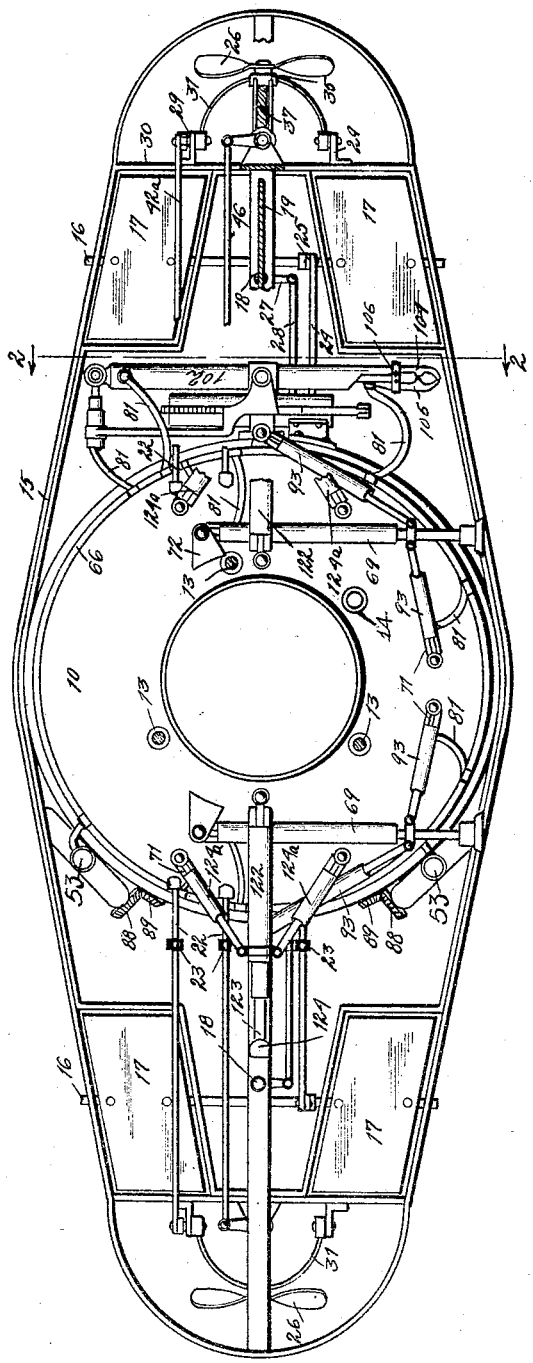

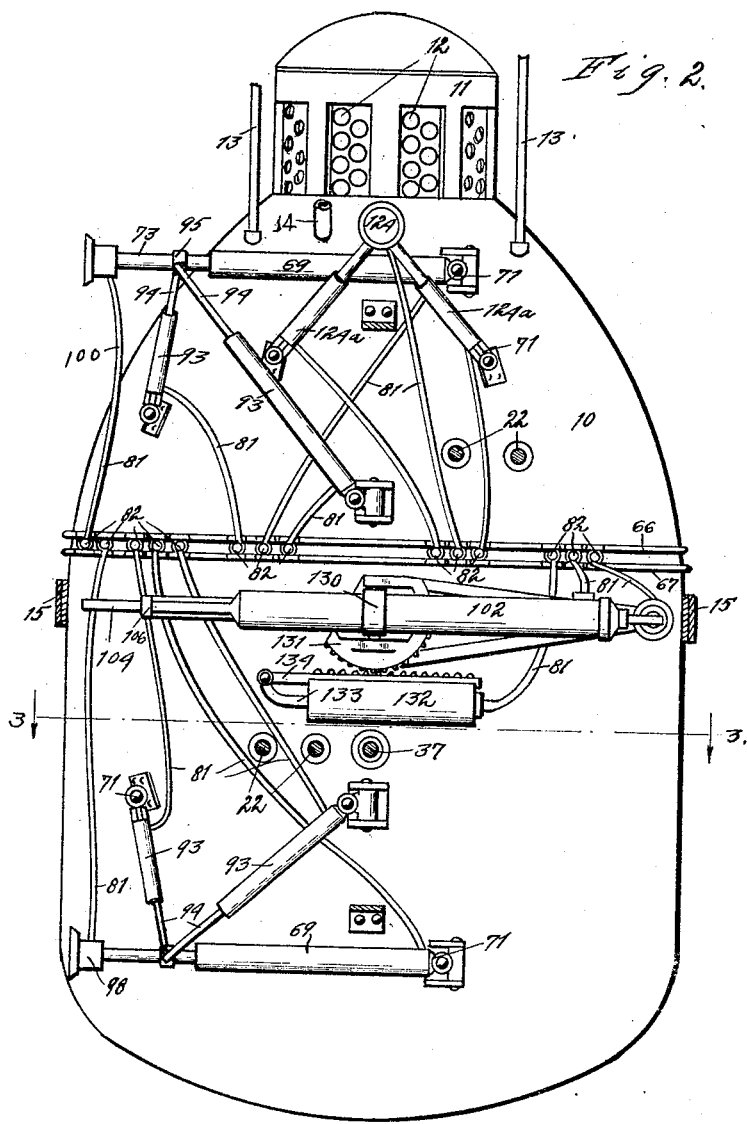

A. J. BERGERON.
MACHINE FOR SUBMARINE SALVAGE OPERATIONS.
APPLICATION FILED MAY 11, 1916.
1,304,012.
Patented May 20, 1919.
5 SHEETS—SHEET 3.
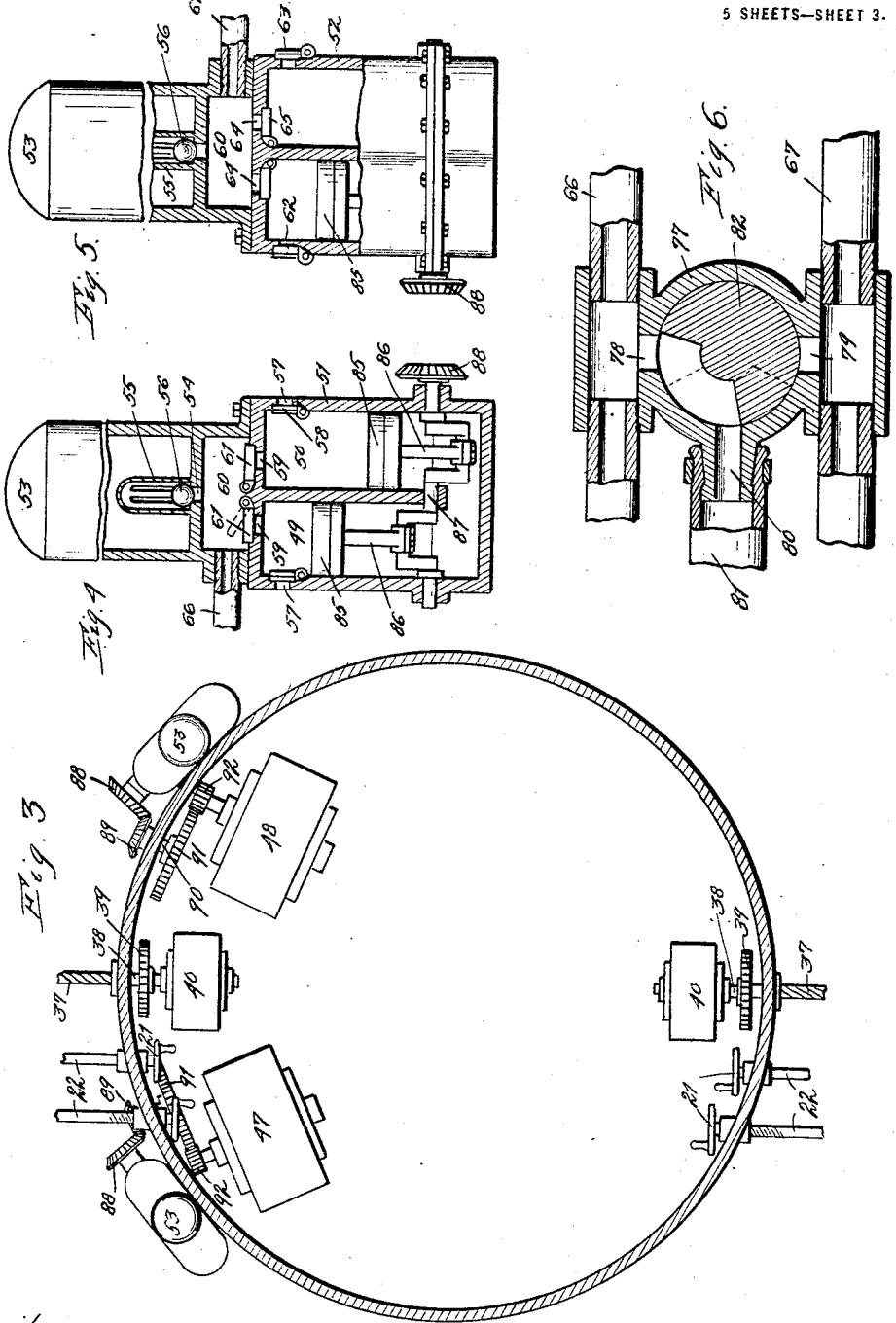

A. J. BERGERON.
MACHINE FOR SUBMARINE SALVAGE OPERATIONS.
APPLICATION FILED MAY 11, 1916.
1,304,012.
Patented May 20, 1919.
5 SHEETS—SHEET 4.
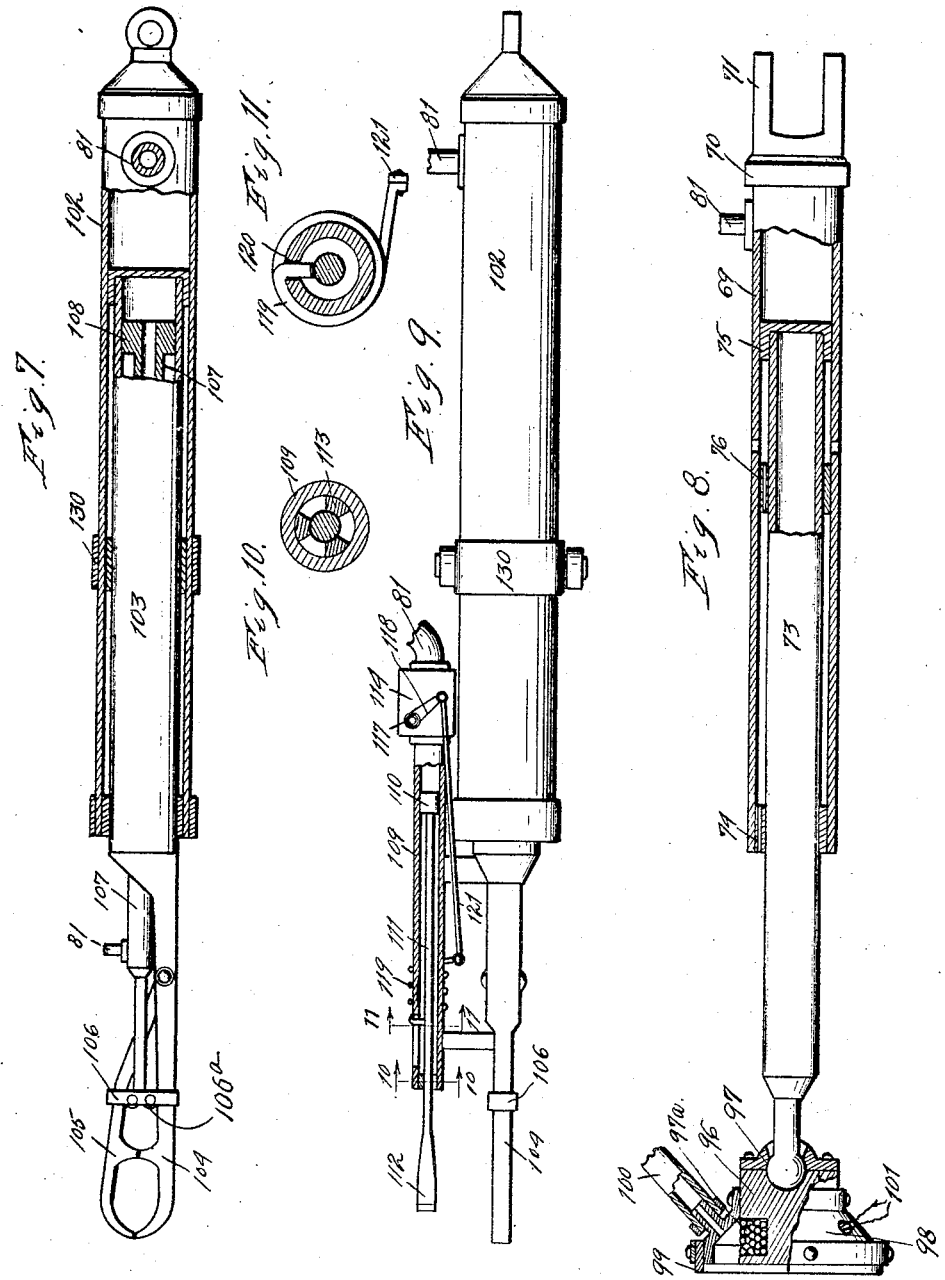

A. J. BERGERON.
MACHINE FOR SUBMARINE SALVAGE OPERATIONS.
APPLICATION FILED MAY 11, 1916.
1,304,012.
Patented May 20, 1919.
5 SHEETS—SHEET 5.
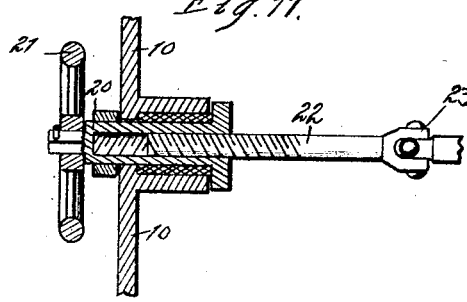
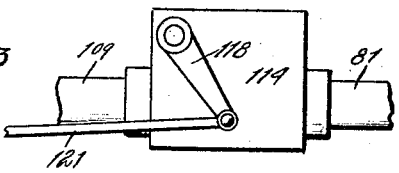
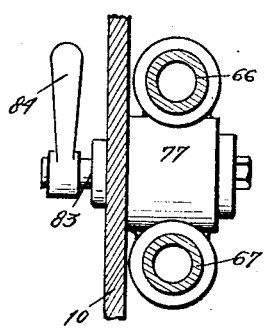
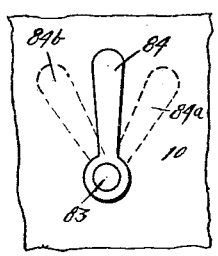
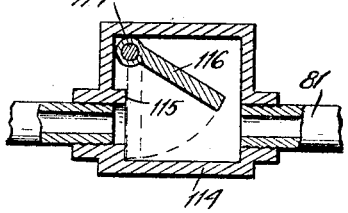
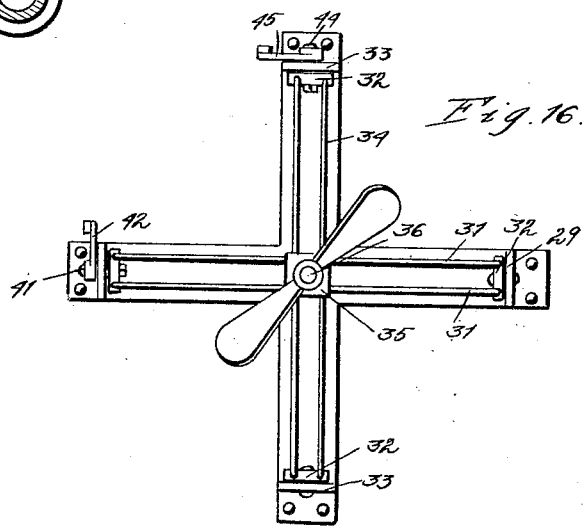

UNITED STATES PATENT OFFICE.

ALEXANDER J. BERGERON, OF DES MOINES, IOWA.

MACHINE FOR SUBMARINE SALVAGE OPERATIONS.

1,304,012.     Specification of Letters Patent.     Patented May 20, 1919.

Application filed May 11, 1916. Serial No. 96,956.

*To all whom it may concern:*

Be it known that I, ALEXANDER J. BERGERON, a citizen of the United States, residing at Des Moines, in the county of Polk and the State of Iowa, have invented a new and useful Machine for Submarine Salvage Operations, of which the following is a specification.

The object of my invention is to provide a machine for sub-marine salvage operations, adapted at all times to be connected with boats or the like on the surface of the water, and to carry one or more operators below the water.

A further object is to provide such a device having a shell, a prime mover, propelling and steering mechanism.

A further object is to provide means for supplying fresh air to and taking used air from the shell and maintaining substantially normal air pressure therein.

A further object is to provide in such a machine specially arranged and constructed sight glasses or the like for affording facilities for observing under sea objects and operations.

A further object is to provide such a device having means outside the shell controllable from within for illuminating any part of the water around the shell.

A further object is to provide in such a machine, a plurality of tools operatively connected with the shell, controllable from within the shell, and adapted to be moved to a variety of positions and to perform a variety of operations, such as striking, pulling, pushing, gripping and so on.

A further object is to provide means, controllable from within the shell, for supplying power to and operating said tools for working them, said means including a cylinder and pistons therein, exposed to the water pressure on one side, a pair of pumps, means for alternately operatively connecting said pumps with said cylinder on the other side of said piston for alternately subjecting said piston to greater pressure and less pressure than the water pressure.

A further object is to provide in connection with the last means above, air cushioning devices, whereby the operation of the pumps and the water pressure is cushioned for operating the tools with elastic force.

A further object is to provide a process for operating a tool under water comprising the subjecting of one side of a piston in a cylinder alternately to less and greater pressure than the normal water pressure.

My invention consists in the construction, arrangement and combination of the various parts of the device, whereby the objects contemplated are attained, as hereinafter more fully set forth, pointed out in my claims and illustrated in the accompanying drawings, in which:

Figure 1 shows a top or plan view of a machine embodying my invention.

Fig. 2 shows a vertical sectional view taken on the line 2—2 of Fig. 1.

Fig. 3 shows a horizontal sectional view taken on the line 3—3 of Fig. 2.

Fig. 4 shows a vertical sectional view of one of the cushioning devices.

Fig. 5 shows a side elevation, partly in vertical section of another of said devices.

Fig. 6 shows a sectional view of one of the three way valves and parts connected therewith.

Fig. 7 shows a detail view of one of the working tools, partly in section.

Fig. 8 shows a detail view partly in section of another tool.

Fig. 9 shows a detail view partly in section of still another tool.

Fig. 10 shows a sectional view taken on the line 10—10 of Fig. 9.

Fig. 11 shows a sectional view taken on the line 11—11 of Fig. 9.

Fig. 12 shows a detail view in side elevation of part of the mechanism.

Fig. 13 shows a vertical sectional view through the mechanism shown in Fig. 12.

Fig. 14 shows a vertical sectional view of part of the wall of the shell, with the three way valve casing and valve controlling handle shown in side elevation.

Fig. 15 shows a detail view of said handle, the dotted lines illustrating different positions thereof.

Fig. 16 shows a rear elevation of one of the propellers and the supports therefor.

Fig. 17 shows a detail vertical sectional view of part of the mechanism.

Heretofore sub-marine operations at great depths have been difficult and to a large extent impossible on account of the tremendous pressure of the water and the consequent difficulty experienced by human beings in remaining at great depths.

When incased in suitable armor or the like, the person working in the water has been handicapped by the lack of proper tools. It is, therefore, my purpose to provide a shell in which the operator can remain free from the tremendous water pressure with parts so constructed as to permit free observation of the space in the vicinity of the shell, and to provide also proper tools accessible to the operator within the shell.

In the accompanying drawings, I have used the reference numeral 10 to indicate a shell which may be somewhat oval in form, the form employed being such as to best enable the shell to withstand the water pressure. The shell 10 is preferably made of steel or other very strong material and is provided at its upper end with a look-out tower 11 having a plurality or series of staggered sight glasses 12.

Strong cables 13 may be connected with the shell 10 for raising or lowering it, and tubes or the like 14 may be used for supplying fresh air and taking away used air, and affording a conduit for electric wires or the like.

A strong frame 15 extends rearwardly and forwardly from the shell.

Transversely mounted on the frame 15 rearwardly and forwardly of the shell are shafts 16, on which are mounted pairs of blades 17, serving the purpose of a fish's fins, or the elevating plane or rudder of an aeroplane.

Suitably mounted rearwardly and forwardly from the shell 10 are upright shafts 18 on which are mounted blades 19 in vertical planes, capable of swinging when the shafts 18 are rotated for serving as steering rudders.

Mounted for rotation in the wall of the shell 10 by means of tight joints, are suitable outwardly opening cylinders 20, controlled by hand-wheels 21 or other suitable means within the shell 10 (see Fig. 17).

The cylinders 20 are internally screw-threaded to receive a screw-threaded rod 22, outside the shell. The screw-threaded rod 22 is connected by a universal joint 23 with a rod 24, which is pivoted at its outer end to an arm 25 on the shaft 16.

Thus it will be seen that by rotating the handwheel 21 the rod 22 may be forced inwardly or outwardly for imparting rotation to the shaft 16 for thereby tilting the blades 17.

Mechanism similar to that just described is used for controlling the blades 19, except that there is connected with the shaft 18 an arm 27, which performs substantially the same function as the arm 25 in connection with the shaft 16.

Pivoted to the arm 27 is a rod 28 which is connected by a universal joint 23 with a rod 22 similar to that already described.

It will be understood that suitable mechanism such as has been herein described, is provided for controlling each of the shafts 16 and 18. Thus it will be seen that the blades 17 and 19 may be tilted to any desired position for steering or for elevating or lowering the machine when the propellers 26, hereinafter more particularly referred to, are operated.

Near each end of the frame 15 is a propeller supporting frame comprising horizontally spaced brackets 29 preferably mounted on the frame member 30. Pivoted to the brackets 29 to swing up and down, are parallel guides 31. The ends of the guides 31 are secured to blocks 32 which are suitably pivoted to the brackets 29 (see Fig. 16).

Between the brackets 29 and respectively above and below, are vertically spaced brackets 33 on which are pivoted blocks 32 similar to those already described. Secured to the blocks 32 last described, are the ends of parallel guides 34 adapted to swing from side to side. The guides 31 and 34 are preferably made substantially in the form of half circles, as shown in Fig. 1.

Slidably mounted on the guides 34 and also on the guides 31, is a bearing block 35. The parts just described are so arranged that by swinging the guides 31 and 34, the propeller may move to a great variety of positions.

The propeller shaft 36 is connected by a flexible shaft 37 with the shaft 38 rotatably mounted in the wall of the shell 10, by means of any suitable water-tight packing. (See Fig. 3). The shaft 38 has a gear 39 on the inside of the shell operatively connected with an electric motor 40. Similar propeller mechanism is provided at each end of the frame 15.

At each end of the frame one of the blocks 32 is pivotally mounted on one of the brackets 29 by means of a shaft 41 or the like, on which is fixed a laterally extending arm 42. The arm 42 is connected by a rod 42$^a$ and universal joint 23 similarly to those already mentioned with one of the shafts 22 mounted in the wall of the shell 10 in the manner hereinbefore described, and moves inwardly and outwardly as has been before set forth. It will be seen that when the rod 42$^a$ is moved longitudinally, the bearing block 35 for the propeller will be raised or lowered.

One of the blocks 32 near each end of the frame 15 is pivoted to one of the brackets 33 by means of the short shaft 44 similar to the shaft 41. On the shaft 44 is fixed a laterally extending arm 45 which is connected by means of a rod 46 and a universal joint 23 similar to that already described, with another of the rods 22. By moving the rod 46 longitudinally, the propeller may be swung from side to side.

It will be seen that by swinging the propeller up and down and sidewise, and by inclining the blades 17 and 19 at different angles, the machine may be propelled and guided in various directions when the propellers are rotated by the motors 40.

I provide a variety of tools mounted outside the shell but controllable from within the shell, and for controlling and operating the tools I provide mechanism whereby parts of the tools are alternately subjected to greater or less than the normal water pressure at the point where the shell stands.

I will now describe some of the various tools used, and the mechanism whereby they are operated.

I provide inside the shell two motors 47 and 48 (Fig. 3). Outside the shell, preferably near the respective motors 47 and 48, are pumps 51 and 52 preferably in each case comprising parallel cylinders 49 and 50.

Mounted above each pump is an air tank 53 closed at all points except for an intake and outlet opening 54 in its lower wall. Mounted above the opening 54 in the bottom of each air tank 53, is a cage 55 having openings in its walls. The cage 55 holds a ball valve 56 adapted to coact with a suitable valve seat formed around the opening 54.

The cylinders of the pump 51 are preferably provided with openings 57 in their walls. Formed around the openings 57 are valve seats with which coact the inwardly opening valves 58. Openings 59 lead from the cylinders 49 and 50 of the pump 51 to an intermediate chamber 60 between the lower wall of the air tank 53 and the pump 51. Outwardly opening valves 61 are adapted to close the openings 59.

The pump 52 is similar in construction to the pump 51 except that it has openings 62 in the walls of its cylinders, controlled by outwardly opening valves 63, and that it has openings 64 communicating with the chamber 60 similar to those already described, and controlled by inwardly opening valves 65. It should be noted that the openings 57 and 62, when the valves 50 and 63 are opened, communicate with the water of the sea in which the shell is located.

Connected with the chamber 60 above the pump 51 is a tube 66 extending around the shell, and terminating at a suitable point adjacent to the last tool to be operatively connected with the pumps. Communicating with the chamber 60 above the pump 52 is a similar tube 67 extending parallel with the tube 66 around the shell. A plurality of tools are provided which are designed to be connected with the pumps in the manner hereinafter described.

I shall now describe some of the tools:

In Fig. 8 I have shown a tool member comprising a cylinder 69 having a closed end 70 pivoted by the means 71 to brackets 72 on the shell Fig. 1. Slidingly mounted in the cylinder 69 is a piston comprising a cylinder 73 of smaller diameter than the cylinder 69.

In the outer end of cylinder 69 is a bearing sleeve 74 in which the piston 73 slides. On the inner end of the piston cylinder 73 is a cap 75 of such diameter as to snugly fit and to slide freely in the cylinder 69. Mounted within the cylinder 69 and fixed thereto at a point spaced from the outer end thereof is a collar 76 which limits the outward sliding movement of the piston. By spacing the collars 74 and 76 from each other a comparatively long bearing is provided for the piston 73 at all times so that even when the piston 73 is at the outer limit of its movement it is not likely to be twisted off.

At a suitable point between the tubes 66 and 67 is a valve casing 77 (Figs. 6 and 14) having in its walls a passage 78 communicating with the tube 66 and a passage 79 communicating with the tube 67, and a passage 80 communicating with the tube 81 which leads to and communicates with the rear end of the cylinder 69. Mounted in the casing 77 is a three-way valve 82, having a stem 83 which extends through the wall of the shell by a water-tight joint and has on its inner end within the shell a controlling handle 84 shown in Figs. 14 and 15. The valve just described is so constructed that when the handle 84 stands in one position as shown by the dotted lines 84$^a$ in Fig. 15, the opening in the valve will communicate with the passages 78 and 80 thereby connecting the cylinder 69 with the pump 51.

When the handle 84 is moved to the position shown by full lines in Fig. 15 the valve 82 stands in what may be called neutral position with both passages 78 and 79 closed. When the handle 84 is moved to the position shown by the dotted lines 84$^b$ in Fig. 15 the valve 82 is moved until its opening communicates with the passages 79 and 80 thereby connecting the cylinder 69 with the pump 52.

In the cylinders 49 and 50 of the pump 51, are mounted pistons 85 connected by piston rods 86 with a crank shaft 87. The cylinders of the pump 52 have similar pistons connected with a similar crank shaft. The crank shafts 87 have on their outer ends outside of the cylinders of the pumps 51 and 52 beveled gears 88, in mesh with beveled gears 89 on shafts 90 which extend through the wall of the shell by water-tight joints. On the shafts 90 inside the shell are gears 91 which mesh respectively with gears 92 on the shafts of the motors 47 and 48. Before the device is lowered into the water air is forced into the tanks 53 under pressure. The tank 53 connected with pump 51 is filled with air under pressure greater than that of the water at the depth where the machine is to be used. The tank connected with the pump 52 is filled with air under pressure somewhat less than that of the water at the depth mentioned.

Insomuch as the operation of the pistons of the various tools is substantially the same in the case of all the tools, the operation of the piston 73 will now be described. Assuming that the piston 73 is at the inward limit of its movement and that it is desired to move it outwardly, the handle 84 is moved to the position shown by the dotted lines 84$^a$ in Fig. 15, the motors are started, whereupon water will be pumped by the pump 51 through the chamber 60 and the pipe 66 to the valve 82 and therethrough to the pipe 81 and to the inner end of the cylinder 69. The pressure of the water will force the piston 73 outwardly, then the handle 84 can be moved to its position shown by full lines in Fig. 15 and the piston 73 will be held at its outer limit of movement. If it is desired to draw the piston 73 inwardly the handle 84 is moved to its position shown by the dotted lines 84$^b$ whereby the valve 82 will be moved to its position for connecting the tube 81 with the tube 67, whereupon water will be withdrawn from the cylinder 69. The collar 74 and the collar 76 have openings through them as shown in Fig. 8 whereby the flange on the cap 75 is subject to the normal water pressure as is the outer end of the tool, and it will thus be seen that the piston 73 will move toward its inner position. For swinging the cylinder 69 and other similar cylinders to different positions, I provide a cylinder 93 pivoted to the shell and having a construction similar to that of the cylinder 69 (Figs. 1 and 2). Mounted in the cylinder 93 is a piston 94 similar except as to size to the piston 73, which projects outwardly and is pivoted to the collar 95 in which the piston 73 is slidably mounted. Owing to the fact that the cylinders 69 and 93 are pivoted at different points on the shell, it will be seen that by forcing the piston 94 inwardly and outwardly the cylinder 69 will be moved to different positions on its pivot point. In this connection it may be mentioned that the cylinders 69 and 93 and the other cylinders mentioned herein are mounted on the shell by means of universal joint pivot connections 71 hereinbefore referred to.

Another cylinder 93 is similarly connected with the collar 95. It will be seen that by properly actuating the pistons 94 the movements of the cylinder 69 may be accurately controlled. It will be understood that the cylinder 93 will be connected with a three-way valve by a tube 81 similar to that already described.

At the outer end of the piston 73 is mounted a head comprising a soft iron core 96 which is connected with the piston 73 by a ball and socket joint 97. The soft iron core 96 is provided with suitable wiring 97$^a$ whereby the core may be energized for securing the tube to the iron hull of a vessel. Mounted on the core 96 is an outwardly flaring shell 98, having at its periphery a resilient ring 99. Communicating with the interior of the shell 98 is a tube 100 which is suitably connected with one of the three-way valves 82 whereby when the ring 99 is placed against a vessel the proper valve 82 may be operated for removing water from the shell 98, whereupon the pressure of the outside water will cause the tool to be firmly held against the vessel or the like.

The wiring 97$^a$ is connected by current conducting wires 101 with interior of the shell.

In Figs. 7 and 9 I have shown a different form of tool, comprising a cylinder 102 similar to the cylinder 69 already described, connected by tube 81 with one of the three-way valves 82. Slidably mounted in the cylinder 102 is the piston 103. On the outer end of the piston 103 is a jaw member 104 pivoted to which is a co-acting jaw member 105. Receiving and slidably mounted upon the jaw members 104 and 105, is a collar 106 having rollers 106$^a$ adapted to co-act with the adjacent surfaces of the shanks of said jaw members. It will be seen that when the collar 106 is moved longitudinally toward the cylinder 102 the jaw 105 will be forced away from the jaw member 104, and when the collar 106 is moved away from the cylinder 102 the jaw members will be forced together. For operating the collar 106 I have provided a piston 107 slidably mounted in the hollow piston 103 and having at its inner end an annular ring or flange 108. The piston 107 is tubular in form, open at its inner end and closed at its outer end. The piston 107 at its outer end communicates by means of a tube 81 with one of the three-way valves 82. It will be seen that by properly operating the valve 82 connected with the piston 107 the water can be forced into or withdrawn from the hollow piston 103, between the inner end thereof and the inner end of the piston 107, for reciprocating said piston 107 and operating the jaws 104 and 105.

It appears therefore that the jaws 104 and 105 may be moved longitudinally with relation to the cylinder 102 by the reciprocation of the piston 103. The jaws can also be operated for grasping or releasing objects by reciprocating the piston 107.

The means for swinging the cylinder 102 to various positions will be hereinafter described.

In the drawings I have shown a striking tool mounted on the piston 103.

As a matter of fact the striking tool may be supported in any suitable and desirable way. The striking tool shown comprises a hollow cylinder 109 in which is slidably mounted a piston 110 having a long stem 111 projecting from the forward end of cylinder 109 and having at its forward end a chisel-shaped member 112. In the outer end of the cylinder 109, are mounted spacing and bearing blocks 113 which serve to form a bearing for the stem 111 and are spaced from each other to admit water whereby the piston 110 may be on one side subjected to the normal water pressure at whatever depth the machine may be located (Fig. 10).

In connection with the striking tool now being described I have shown a cushioning device for preventing the piston from being forced out of the outer end of the cylinder, which will now be described. The rear end of the cylinder 109 communicates with one of the tubes 81. Interposed between the tube 81 and the end of the cylinder 109 in communication therewith is a receptacle 114 having formed therein a valve seat 115 shown in Fig. 13. Pivoted within the receptacle 114 is a gate valve 116 adapted to coact with the seat 115 and having a stem 117 projecting through the wall of the receptacle 114. Fixed on the stem 117 at its outer end is an arm 118. Wound on the cylinder 109, near the forward end thereof is a coil spring 119, one end of which is extended into a horizontally elongated slot 120 in the wall of the cylinder 109 near its forward or outer end as shown in Figs. 9 and 11. The other end of spring 119 is pivoted to a link 121. Said link 121 is pivoted to the arm 118.

The operation of the parts just described is as follows: The spring 119 normally holds the valve 116 in its open position. When the tool 112 is in its retracted position with the piston 110 near the inner end of the cylinder 109 the valve and the parts are left subjected to the normal water pressure and the valve 116 is open. Assuming that the proper valve 82 is manipulated to put the cylinder 109 into communication with the tube 66 whereby the piston 110 is subjected at its inner end to greater pressure than that of the surrounding water, the piston 110 will be driven outwardly and by adjusting the tool the member 112 can be used as a chisel or ax. If the tool should not be properly adjusted for the first stroke it will be seen that the piston 110 would tend to drive out the blocks 113. This undesirable result is, however, avoided by the use of the parts hereinbefore described. The piston 110 before reaching the members 113 engages the inwardly projecting end of the spring 119 and operates said spring for closing the valve 116 whereupon the valve 116 takes the pressure of the pump.

It will, of course, be understood that any of the piston operated tools herein described may be provided with a cushioning device just explained.

For swinging the cylinder 102 to various positions of its movement the following mechanism is provided.

On the cylinder 102 is a collar 130 pivoted onto which is a segmental gear 131.

Mounted on the shell 10 is a cylinder 132 connected by a tube 81 with one of the three-way valves 82.

Within the cylinder 132 is a piston similar to the piston 73 having a stem 133, the end of which is inclined upwardly and is pivoted off center to a segmental rack 134 in mesh with the gear 131.

By reciprocating the piston in the cylinder 132 the rack 134 is operated for rotating the gear 131 and for thereby raising and lowering the outer end of the cylinder 102.

Pivoted on the shell 10 is a cylinder 122 shown in Fig. 1, communicating by means of a tube 81 with one of the valves 82. Slidably mounted in the cylinder 122 is a piston 123 on the outer end of which is an electric light device 124 of any suitable construction. For swinging the cylinder 122 suitable devices 124 similar to those herein repeatedly described are employed.

It will be understood that the wires 101, shown in Fig. 8 are extended through the wall of the shell 10 by a water-tight joint and are designed to be connected with a suitable source of electrical energy. The lighting devices 124 may be similarly connected with batteries or the like.

The particular kind of tools herein shown and illustrated are shown largely for the purpose of suggestion and it should be understood a great variety of tools, in slightly different forms for accomplishing different purposes, may be employed and operated in a manner similar to that above described. The most important feature as I view it at this time in connection with the operation of these various tools, exists in the construction of parts whereby the pistons are most of the time subjected to the normal water pressure at the depth where the shell is located and in the arrangement of the mechanism whereby the piston is operated by alternately subjecting it to greater or less pressure than the normal water pressure.

In the practical operation of my improved machine for sub-marine salvage operations the parts are assembled and prepared for use. The shell 10 is closed and lowered into the water by means of the connecting cables and the like 13. Air and electrical power may be furnished through the tube 14. The cables 13 may be given plenty of slack and by operating the blades 17 and 19 and the propellers the shell may be steered and propelled in any direction. When the sought for object, for instance the hull of a sunken vessel, is reached the operator probably will first manipulate his lights to make a thorough observation of the wreck and the bottom of the sea surrounding it. The various tools may then be employed in the way most desirable for salvage operations. Attention is called to the peculiar advantage under which the pumps are operated whereby they either pump the sea water into or out of the cylinders and the relative power secured is practically the same at all depths. On account of the fact that the elasticity of water is not great, I have provided the air tanks 53 for cushioning the strokes of the pistons.

In this connection it may be mentioned that when the device is to be sent down any desired depth of water it may be so weighted that it will normally drop to the bottom and rest there in such condition as to be not quite buoyant. The various propellers and blades can then be used for moving it about from place to place, and of course, where wrecks, rocks or other solid matter are to be raised, the "sucker" device may be used for securing the shell in any desired position.

It will be readily understood that numerous changes may be made in the arrangement and construction of the various parts of my improved machine and it is my intention to cover by my present application any such changes in construction which may be included within the scope of my claims.

I claim—

1. In a device of the class described, a water tight chamber, a pair of motive power devices therein, a pair of water pumps outside said chamber, means for operating said pumps from said motive power device, a cylinder having a piston therein, said cylinder being open on one side of the piston to the pressure of the water surrounding the device, means for alternately connecting said piston within said cylinder on the opposite side thereof to the action of the respective pumps, and means for subjecting water passing through said pumps to the cushioning effect of air under pressure, respectively, greater and less than that of the surrounding water.

2. In a device of the class described, a tool for submarine work comprising a cylinder, a piston mounted therein for reciprocation, a tool member connected with said piston, said cylinder having an opening for permitting one end of the piston to be in communication with the space outside the cylinder, a tube communicating with the cylinder on the other side of the piston from said opening, a valve casing in said tube, pump devices adapted to be selectively connected with said tube for subjecting one end of said piston to greater or less pressure than that of the space outside the cylinder, a valve in said casing, a spring operatively connected with said valve and adapted to be engaged by said piston in one position of said movement.

3. In a device of the class described, a tool for submarine work comprising a cylinder, a piston mounted therein for reciprocation, a tool member connected with said piston, said cylinder having an opening for permitting one end of the piston to be in communication with the space outside the cylinder, a tube communicating with the cylinder on the other side of the piston from said opening, a valve casing in said tube, pump devices adapted to be selectively connected with said tube for subjecting one end of said piston to greater or less pressure than that of the space outside the cylinder, a valve in said casing, a spring operatively connected with said valve and adapted to be engaged by said piston in one position of said movement, a shell for supporting said cylinder, said pump devices being operable from within said shell.

4. In a device of the class described, a hollow shell, a propeller arranged outside said shell, means for supporting said propeller for permitting it to be swung laterally, said means being capable of vertical pivotal movement, means for supporting said propeller for permitting it to be swung vertically, said means being capable of horizontal, pivotal movement, and means for imparting rotation to said propeller in all positions of its movement.

5. In a device of the class described, a hollow shell, a propeller outside of said shell, a pair of guide devices for supporting said propeller for permitting it to be swung laterally, said guide devices being pivoted at their ends for permitting them to be swung vertically, a second pair of guide devices for supporting said propeller for permitting it to swing vertically, said second pair of guide devices being pivoted at their ends to permit them to swing horizontally, means for operating said propeller in all positions of its movement, and means for moving said guide devices on their pivot points.

6. In a device of the class described, a hollow shell, a frame projecting away therefrom, a propeller arranged within the outline of said frame, means for supporting said propeller for permitting it to be swung laterally said means being capable of vertical pivotal movement, means for supporting said propeller for permitting it to be swung vertically, said means being capable of horizontal, pivotal movement, means for imparting rotation to said propeller in all positions of its movements, a blade pivotally mounted within the outline of said frame capable of up and down movement, and a blade mounted within the outline of said frame capable of lateral, swinging movement.

Des Moines, Iowa, April 24, 1916.

ALEXANDER J. BERGERON.